United States Patent [19]
Saito et al.

[11] 3,999,191
[45] Dec. 21, 1976

[54] EXPOSURE TIME CONTROL DEVICE OF ELECTRIC SHUTTER FOR CAMERA

[75] Inventors: Takeo Saito; Youichi Seki, both of Chiba, Japan

[73] Assignee: Seiko Koki Kabushiki Kaisha, Japan

[22] Filed: Aug. 23, 1974

[21] Appl. No.: 499,977

[30] Foreign Application Priority Data

Aug. 24, 1973 Japan .............................. 48-95008

[52] U.S. Cl. ............................... 354/23 D; 354/50; 354/51; 354/60 A
[51] Int. Cl.² ........................................ G03B 7/08
[58] Field of Search ............ 354/23 D, 50, 51, 60 A

[56] References Cited
UNITED STATES PATENTS

| | | | |
|---|---|---|---|
| 3,748,979 | 7/1973 | Wada | 354/23 D |
| 3,824,608 | 7/1974 | Toyoda | 354/23 D |
| 3,827,065 | 7/1974 | Wada | 354/23 D |
| 3,836,262 | 9/1974 | Yata et al. | 354/23 D |
| 3,843,265 | 10/1974 | Egli et al. | 354/23 D |

FOREIGN PATENTS OR APPLICATIONS 45-4903   2/1970   Japan .............................. 354/23 D

*Primary Examiner*—Russell E. Adams, Jr.
*Attorney, Agent, or Firm*—Robert E. Burns; Emmanuel J. Lobato; Bruce L. Adams

[57] ABSTRACT

An electronic camera shutter control circuit having a reversible counter for counting a number of pulses proportional to the duration of an exposure time. When the camera shutter is opened pulses are subtracted from the memory content of the reversible counter until the counter content is zero and the exposure is terminated. The reversible counter includes a final stage which does not change state if the number of pulses applied to the counter exceeds the memory capacity of the counter. For this condition the exposure time is first controlled by the charging time of a capacitor until a voltage stored in the capacitor exceeds a certain value whereupon the memory content of the counter is subtracted until it is zero and the exposure is terminated.

3 Claims, 7 Drawing Figures

EXPOSURE TIME CONTROL DEVICE OF ELECTRIC SHUTTER FOR CAMERA

BACKGROUND OF THE INVENTION

The present invention relates to an exposure time control circuit of an electric shutter for a camera using a digital memory and read out system. The present invention especially relates to improvements for the type circuit in which the memory value to be counted in a counting circuit exceeds the capacity of the counting circuit.

Known electric shutter control circuits use a digital memory counting and read out system so arranged that standard pulses are counted and memorized in the counting circuit during the generation of a single pulse with a pulse width representative of the brightness of a subject to be photographed. This system cannot continue to count pulses where the memory value rises above the maximum capacity of the counting circuit. In this device, the photographic limits are determined by the memory capacity of the counting circuit, and to increase the memory capacity of the counting circuit in consideration of an exposure time of hours, the number of counting stage of the counting circuit must be increased, and therefore, that results in increased cost as well as complication of the circuit.

SUMMARY OF THE INVENTION

An object of the present invention lies in minimizing the number of counting stages of the counting circuit and also in controlling a time of exposure of more than the limits determined by the memory capacity of the counting circuit.

The exposure time control circuit for an electric shutter comprises a circuit having holding functions and receptive pulses generated from the last stage of a counting circuit. Upon receiving the pulses the state of the circuit is inverted and remains in the inverted state even if more pulses are applied thereto from the last stage of counting circuit.

DETAILED DESCRIPTION OF THE PREFERRED EMBODIMENT

Figure 1:
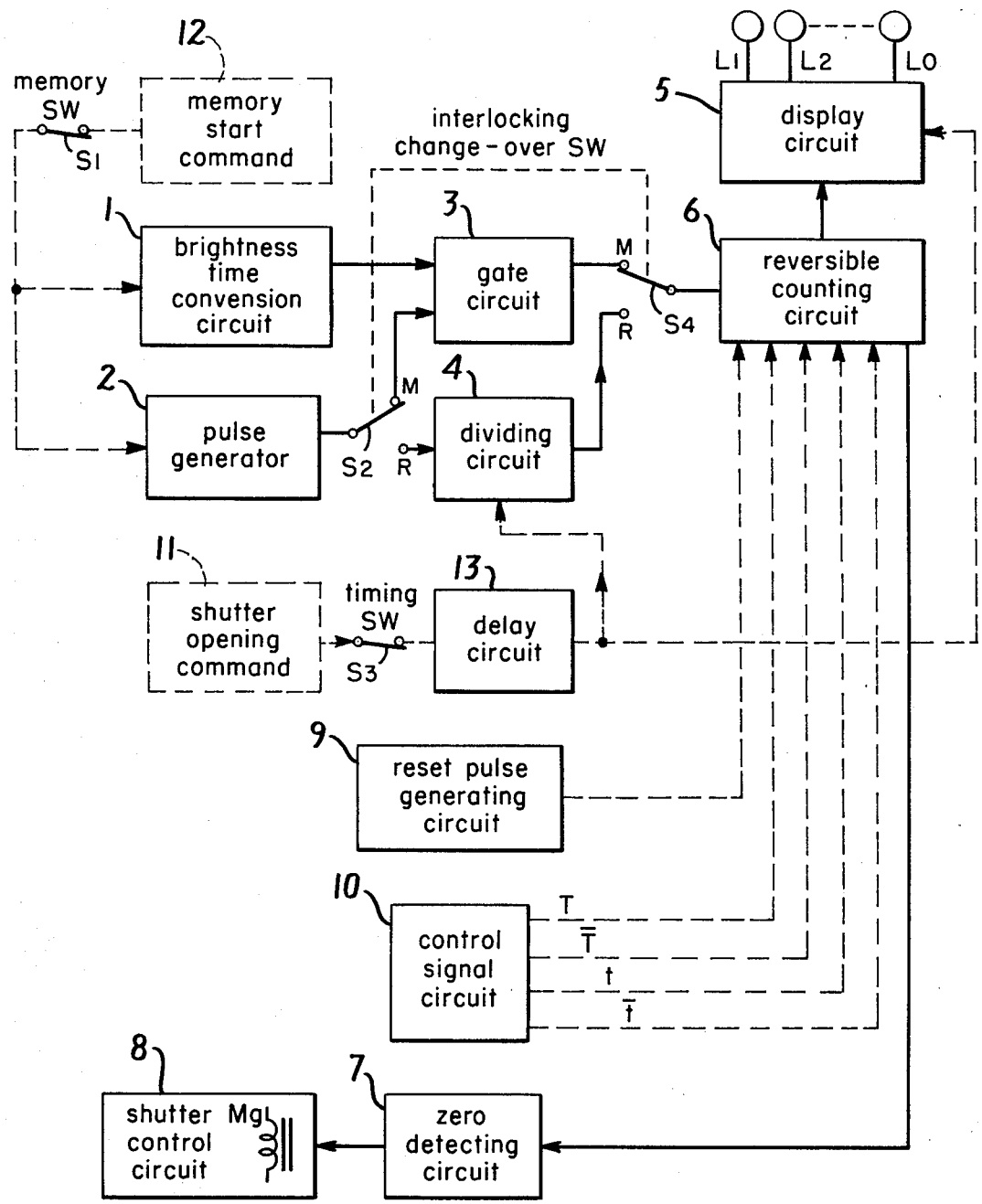
FIG. 1 is a block diagram of a shutter control circuit according to the present invention.

The present invention will be described in detail with reference to drawings. FIG. 1 is a block diagram showing the structure of an exposure control circuit including the present invention in which the signal paths shown as dotted lines are paths for control signals which control the operation of the various stages of the control circuit. The brightness/time conversion circuit 1 includes a photoconductive cell for generating a single pulse with a pulse length in inverse proportion to the brightness of a subject. The pulse generator 2 is for generating standard pulses with a certain definite frequency, and 3 is gate circuit, capable of sending the standard pulse generated from the pulse generator 2 to the reversible counting circuit 6 during generation of single pulses generated by the brightness/time conversion circuit 1. The reversible counting circuit 6, is controlled for addition and subtraction operations by control signals generated in the control signal circuit 10. The display circuit 5 is for displaying the number of pulses counted in the reversible counting circuit 6. The zero detection circuit 7 is for detecting when the memory content of the reversible counting circuit 6 becomes zero. The shutter control circuit 8 includes electromagnet Mg. Interlocking change-over switches S2, S4 for memory read out interlock for action with the movements of the camera's release button, and thus ensure switching of contacts M. R. in a proper sequence.

When the release button of the camera is depressed, the respective switches are at positions as shown, and reversible counting circuit 6 is then reset by a reset pulse from reset pulse generating circuit 9 and is simultaneously rendered ready for an addition operation by being given an addition control signal T from the control signal circuit 10. If memory switch S1 is opened by depressing release button more, memory start order or command 12 is transmitted to the brightness/time conversion circuit 1 and pulse generator 2. The memory start command 12 is a schematic representation of the mechanical opening command developed by the release button to open memory switch S1 and is represented by dotted lines to indicate that is a control function and not any particular circuit structure. By this action, standard pulses with a certain definite frequency, generated by pulse generator 2, are sent through switch S2, gate circuit 3, switch S4, and the reversible counting circuit 6 in turn counts the number of pulses by addition. The number of pulses now memorized by the reversible counting circuit 6 is in inverse proportion to the brightness of a subject. To wit, if the brightness of a subject is high, the pulse width or duration of the pulse developed by the brightness/time conversion circuit 1 is narrow and consequently the number of standard pulses memorized in the reversible counting circuit 6 is few. If the brightness of a subject is low the pulse width of the pulse developed by the brightness/time conversion circuit 1 is wide and therefore the number of standard memorized pulses by reversible counting circuit 6 is many. The value memorized by the reversible counter circuit 6 is applied to display circuits and lights one of the display elements (i.e. lamp, light emitting diode) L1, L2 - - - Lo, thereby displaying the shutter speed. At the end of the duration of the single pulse generated by the brightness/time conversion circuit 1, reversible counting circuit 9 receives a subtraction control signal $\overline{T}$ from control signal circuit 10, thus being rendered ready for a subtraction mode. Operations up to this are made, for a single-lens reflex camera, before the release button of the camera is completely depressed and the reflector for the view finder goes up thereby interrupting light falling on a photo-conductive cell.

If the reflector for the view finder starts rising after further depressing of the release button, interlocking change-over switches S2, S4 for controlling memory read-out are transferred to the contacts R position, and simultaneously, shutter opening operation starts. The timing switch S3 is made to open by a shutter blade opening member (not shown). Then, shutter opening order or command 11 is transmitted to delay circuit 13. The shutter opening command 11 is a schematic representation of the mechanical opening command developed by the shutter blade opening member to open timing switch S3 and is represented by dotted lines to indicate that it is a control function and not any particular circuit structure. After a delay for a given time determined by the delay circuit 13, the command becomes a trigger pulse to reset display circuit 5 and turn off all the display elements, and allowing frequency dividing circuit 4 to start at the same time. Standard pulses generated by the pulse generator 2 are demultiplied by frequency dividing circuit 4 and sent through switch S4 to the reversible counting circuit 6 where the pulses are subtracted from the memory values stored in the reversible counting circuit 6, and when the content of counting circuit 6 is zero this condition is detected by the zero detection circuit 7, which in turn interrupts the current of electromagnet Mg, controlling the shutter control circuit 8 and locking the blade closing member, which thereby releases the blade closing member thus closing the shutter blades. The frequency dividing circuit 4 may be the commercially available RCA binary counter, type CD4024A, which is disclosed in the RCA Solid State Databook (1972) SSD-203 at page 113.

Figure 2:
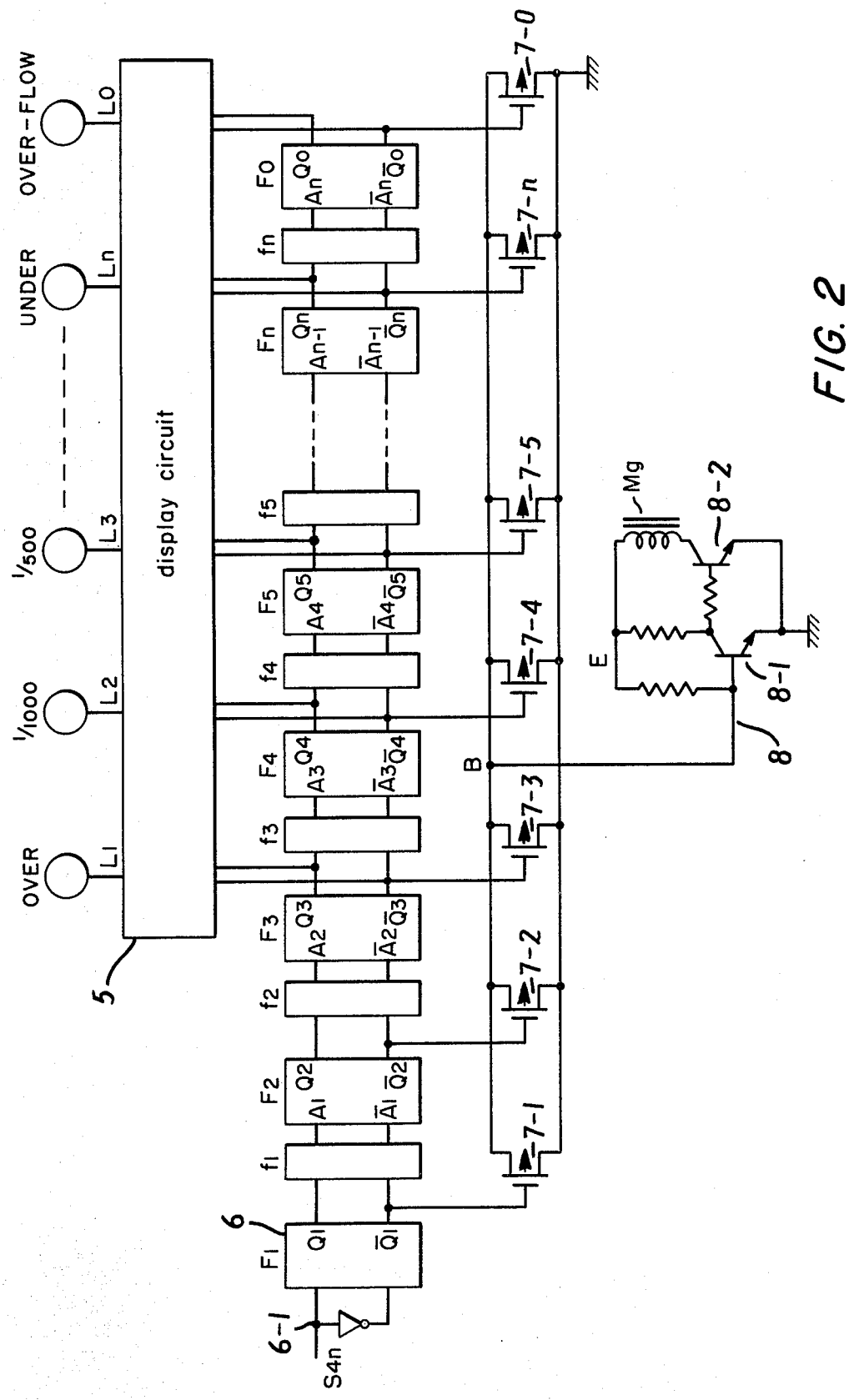
FIG. 2 is a schematic diagram of the reversible counting circuit, zero detection circuit, shutter control circuit, and display circuit shown in FIG. 1.

FIG. 2 shows one embodiment of reversible counting circuit 6 zero detection circuit 7, shutter control circuit 8 and display circuit 5. The reversible counting circuit 6 is comprised of well known binary counting circuits F1, F2, F3, F4, F5 - - - Fn, and between the respective counting stages are connected signal switching circuits $f1, f2, f3, f4, f5$ - - - $fn$ as shown. The modified flip-flop circuit Fo is provided with holding functions and is described in conjunction with FIG. 6. It is connected through $fn$ to the last stage Fn of counting circuit. The outputs $\overline{Q1}, \overline{Q2}, \overline{Q3}, \overline{Q4}, \overline{Q5}$ - - - $\overline{Qn}, \overline{Qo}$ of respective counting stages are connected to the respective gates of the P channel FET 7-1, 7-2, 7-3, 7-4, 7-5 - - - 7-n, 7-o in the zero detection circuit 7. The sources of each of the P channel FET's are connected to ground and the drain of each FET is connected to the base of transistor 8-1 of shutter control circuit 8. The collector of transistor 8-1 is connected through a resistor to the base of transistor 8-2, to which electromagnet Mg is connected. The outputs $\overline{Q3}$ - - - $\overline{Qn}, \overline{Qo}$ of the counting stages are connected to the display circuit 5 as shown.

In operation, depressing the release button allows all outputs $\overline{Q1}, \overline{Q2}, \overline{Q3}, \overline{Q4}, \overline{Q5}$ - - - $\overline{Qn}, \overline{Qo}$ of the respective counting stage F1, F2, F3, F4, F5 - - - Fn, Fo to be rendered high by reset pulses generated from the reset pulse generating circuit 9, while the other outputs Q1, Q2, Q3, Q4, Q5, - - - Qn, Qo become low (High will be assumed to be logical 1; and low, logical 0 hereafter). Therefore, all P channel FET's 7-1, 7-2, 7-3, 7-4, 7-5 - - - 7-n, 7-o are brought to nonconductivity, the drain point B being 1, and consequently transistor 8-1 becomes conductive and transistor 8-2 becomes nonconductive, causing no current to flow through electromagnet Mg. if memory switch S1 is opened upon further depressing of the release button, standard pulses are applied as inputs through the input terminal 6-1 of the initial stage counting circuit F1 and reversible counting circuit 6 counts these pulses. Since at least one of the outputs $\overline{Q1}, \overline{Q2}, \overline{Q3}, \overline{Q4}, \overline{Q5}$ - - - $\overline{Qn}, \overline{Qo}$ of respective counting stages becomes 0 only if standard pulses are memorized by the reversible counting circuit 6, the level at point B of the zero detection circuit 7 becomes 0, and transistor 8-1 is rendered nonconductive while transistor 8-2 is brought to conductivity thereby energizing electromagnet Mg.

The display circuit 5 is controlled by the number of pulses counted and stored in the reversible counting circuit 6, and controls lighting one of the display elements L1, L2, L3 - - - Ln, Lo and thus displaying shutter speed. Standard pulses reduced in frequency by the frequency dividing circuit 4 upon opening of shutter blades are again applied as inputs to the reversible counting circuit 6 through input terminal 6-1. These standard pulses are subtracted from memory values memorized in the reversible counting circuit 6, and when the outputs $\overline{Q1}, \overline{Q2}, \overline{Q3}, \overline{Q4}, \overline{Q5}$ - - - $\overline{Qn}, \overline{Qo}$ of respective counting stages become 1 again all P channel FET's 7-1, 7-2, 7-3, 7-4, 7-5, 7-n, 7-o of zero detection circuit 7 are respectively brought to the nonconductive state. Therefore, the level at B point becomes 1 thus interrupting current flow through electromagnet Mg and the shutter blades are closed.

Figure 3:
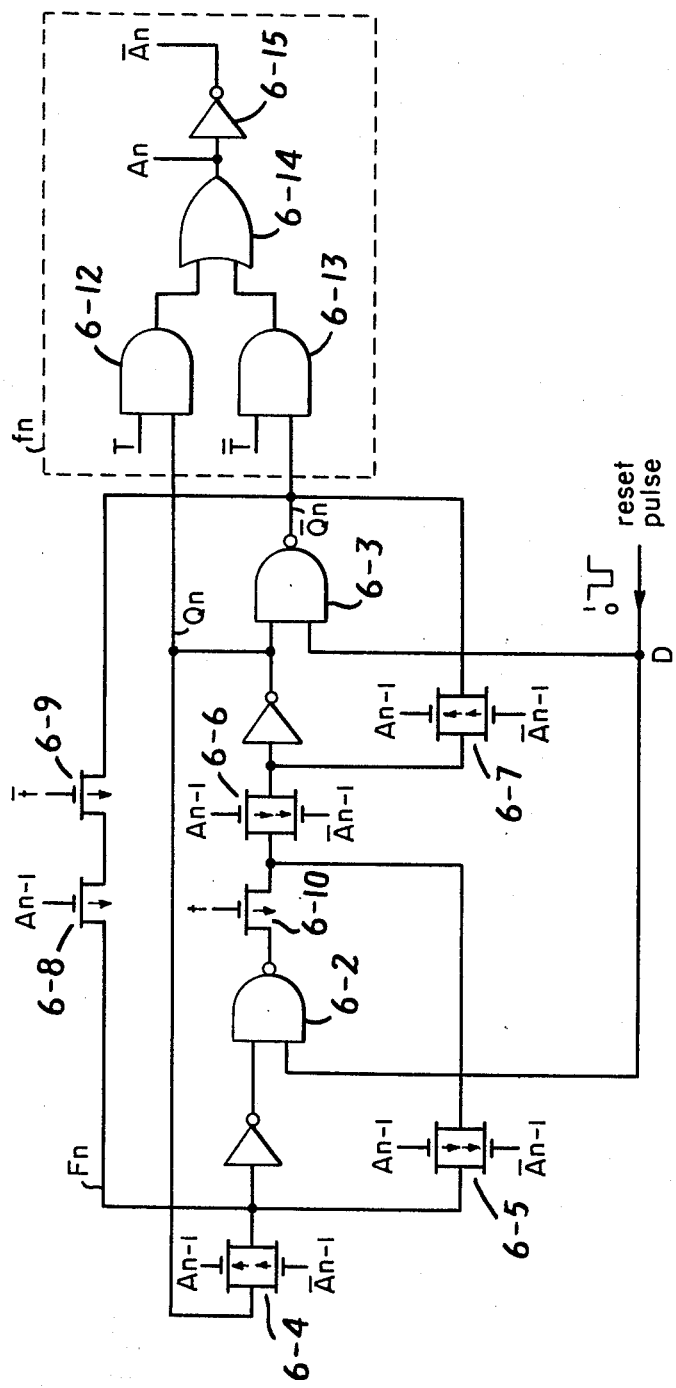
FIG. 3 is a schematic diagram of one state of the reversible counting circuit.

FIG. 3 shows an embodiment of one of the respective counting stages F1, F2, F3, F4, F5 - - - Fn and signal switching circuits $f1, f2, f3, f4, f5$ - - - $fn$ of the reversible counting circuit 6. Since the respective counting stages and respective signal switching circuits are of identical circuitry, only Fn and fn are shown in FIG. 3.

Fn is a master-slave type flip-flop circuit comprised of well-known transfer gates. The output signals An-1, and $\overline{An-1}$ of the previous signal switching circuit Fn-1 (not shown) are applied as inputs to the gates of respective transfer gates 6-4, 6-5, 6-6, 6-7. An-1 and $\overline{An-1}$ have logically complementary signal levels. When An-1 is 1, $\overline{An-1}$ is 0, and if An-1 is 0, $\overline{An-1}$ becomes 1.

One of the inputs for NAND circuit 6-2 at the master section and for NAND circuit 6-3 at the slave section are mutually connected at the point D to which reset pulses are applied from the reset pulse generating circuit 9. Another input for NAND circuit 6-3 is also the output signal Qn for counting circuit Fn, and the output of NAND circuit 6-3 is the output signal $\overline{Qn}$. The outputs Qn, $\overline{Qn}$ are applied as inputs to the signal switching circuit fn. The P channel FET's 6-8, 6-9, 6-10 are respectively connected as shown and their gates are controlled respectively by signals An-1, $\overline{T}$ and $t$.

The signal switching circuit fn, shown surrounded by a dotted line, consists of AND circuit 6-12, 6-13, OR circuit 6-14 and inverter 6-15 which are connected as shown. To the input terminals of AND circuit 6-12 are applied output signal Qn from Fn and addition control signal T. $\overline{Qn}$ and subtraction signal $\overline{T}$ are applied to the input terminals of AND circuit 6-13 and in addition, and output signal An from the output of OR circuit 6-14 and an output signal $\overline{An}$ from the output of inverter 6-15 are used as input signals for next stage counting circuit Fo.

By depressing the release button, addition control signal T becomes 1, subtraction control signal $\overline{T}$ becomes 0, control signal $t$ becomes 0 and $\overline{t}$ becomes 1. Therefore, P channel FET 6-9 is brought to non-conductivity thereby interrupting the signal passage from the output of the NAND circuit 6-3 to the transfer gate 6-4. When reset pulses from reset pulse generating circuit 9 are applied as inputs to the point D, the output levels of NAND circuits 6-2 and 6-3 become 1 when the reset pulse is 0 and output signals Qn and $\overline{Q}$n are held at 0 and 1 respectively. Afterwards, the rest pulse returns to 1 again. If the release button is depressed more, standard pulses are applied as inputs to the stages of the respective counting circuits, and when the output signals An-1, $\overline{A}$n-1 from the previous signal switching circuits are applied as inputs to the transfer gates 6-4, 6-5, 6-6 and 6-7, signal Qn is inverted from 0 to 1 or from 1 to 0 every time An-1 signal shifts from 1 to 0. The signal Qn passes through AND circuit 6-12 and OR circuit 6-14 and is sent to the counting circuit of the next stage as the An or $\overline{A}$n signals. Input pulses are thus added and memorized by the respective counting circuits.

After being delayed for a given time at the time of completion of the single pulses generated by the brightness/time conversion circuit 1, control signals $t$, $\overline{t}$ become 1 and 0 over an interval during which additional control signal T shifts from 1 to 0 and subtraction control signal $\overline{T}$ is changed from 0 to 1. After the control signals $t$, $\overline{t}$ become 0 and 1 again. This is performed in order to prevent any possible error of memory contents generated at the time when signals T, $\overline{T}$ are changed. If pulses are again applied as inputs to the counting circuit after opening of the shutter blades, signal $\overline{Q}$n then passes through AND circuit 6-13 and OR circuit 6-14, as An or $\overline{A}$n signals and is sent to the counting circuit for the next stage. The pulses are then subtracted, as previously described.

Figure 4:
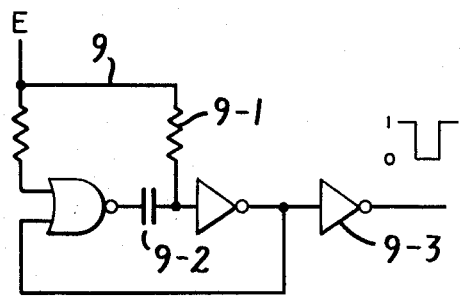
FIG. 4 is a schematic diagram of the reset pulse generating circuit shown in FIG. 1.

FIG. 4 is an embodiment of the reset pulse generating circuit 9 shown in FIG. 1. It is composed of a well known monostable multi-vibrator and inverter as shown, and sends a reset pulse from the inverter 9-3 to each counting circuit. The period during which reset pulse is 0 is determined by the resistance value of resistor 9-1 and the capacity of condenset 9-2.

Figure 5:
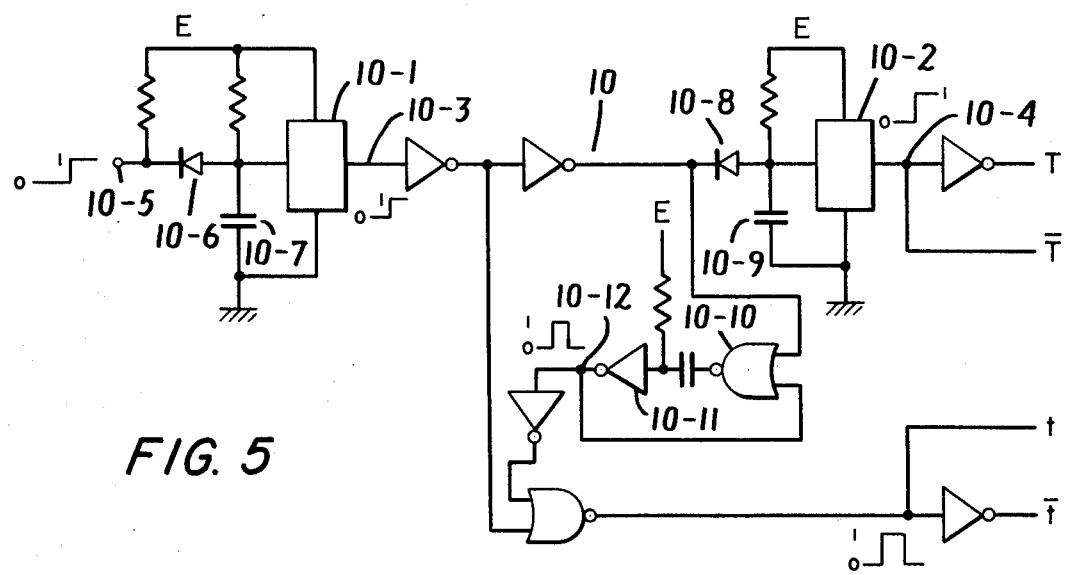
FIG. 5 is a schematic diagram of the control signal circuit shown in FIG. 1.

FIG. 5 is an embodiment of the control signal circuit 10 shown in FIG. 1 Switching circuits 10-1, 10-2 have outputs 10-3, 10-4 normally maintained at 0. Accordingly, signals T, $\overline{T}$ $t$, $\overline{t}$ are 1, 0, 0, 1. Assume a signal to be changed from 0 to 1 at the completion time of the single pulse developed by the brightness/time conversion circuit 1; if it is applied to the input terminal 10-5 of switching circuit 10-1, diode 10-6 becomes nonconductive and the output point 10-3 of switching circuit 10-1 changes from 0 to 1, after a delay for a given time determined by condenser 10-7. By this, diode 10-8 is caused to become nonconductive and condenser 10-9 starts charging and at the same time positive pulses are generated at the output point 10-12 of the monostable multivibrator comprised of NOR circuit 10-10 and inverter 10-11. Hence, signal $t$ changes from 0 to 1 and signal $\overline{t}$ from 1 to 0. When the charging voltage of condenser 10-9 attains a required level, the output point 10-4 of switching circuit 10-2 is inverted from 0 to 1, and signal T changes from 1 to 0 and signal $\overline{T}$ changes from 0 to 1. Afterwards, if the output point 10-15 of monostable multivibrator is shifted again from 1 to 0, signal $t$ then changes from 1 to 0 and signal $\overline{t}$ from 0 to 1.

Figure 6:
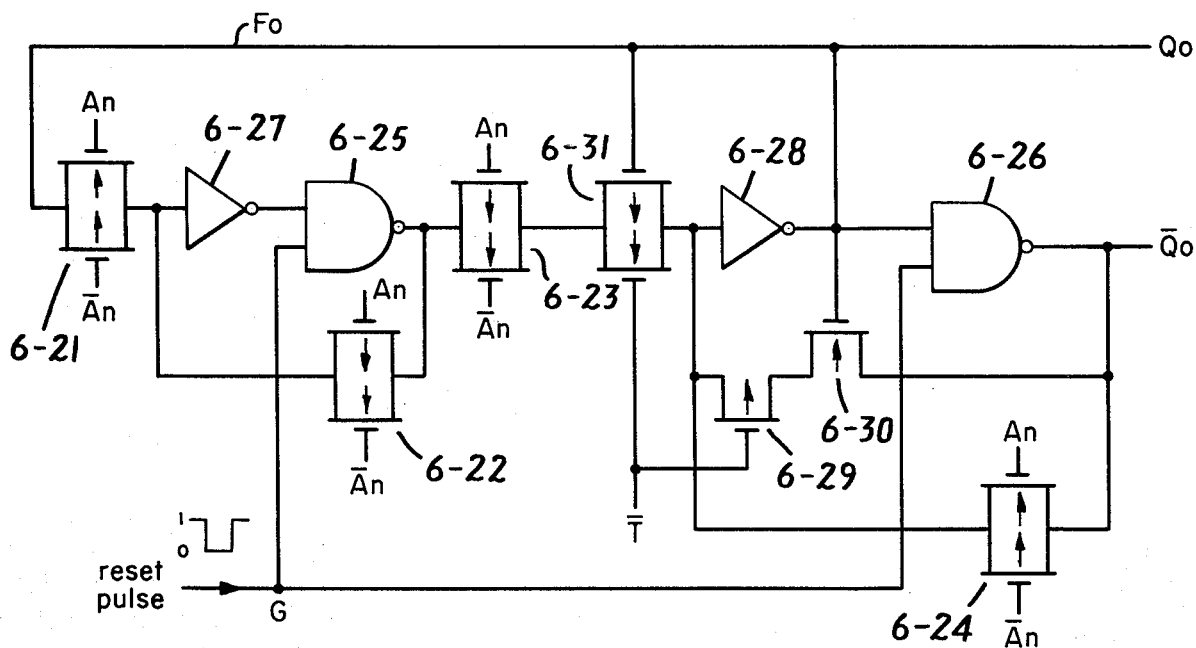
FIG. 6 is a schematic diagram of the final stage of the counting circuit according to the present invention.

FIG. 6 is an embodiment of the counting circuit Fo provided with holding functions which is connected to the last stage of the reversible counting circuit as shown in FIG. 2. The counting circuit Fo is comprised of a modified master-slave type flip-flop circuit. The output signals An and $\overline{A}$n of signal switching circuit fn at the last stage of the reversible counting circuit 6 are connected to the gates of transfer gates or bilateral switches 6-21, 6-22, 6-23, 6-24. The bilateral switches may be COS/MOS pairs of the type utilized in the RCA bilateral switch, type CD4016A, which is disclosed in the RCA Solid State Databook (1972) SSD-203 at page 67. One input terminal of NAND circuit 6-25 at the master section and one input of NAND circuit 6-26 at the slave section are connected to each other at G and reset pulses are applied as inputs to the point G. Another input of NAND circuit 6-26 and the output of NAND circuit 6-26 are output signal Qo and output signal $\overline{Q}$o respectively to the display circuit 5 and the gates of P channel FET 7-0 of zero detection circuit 7 (FIG. 2).

If reset pulse 0 is applied as an input, the output of both NAND circuits 6-25 and 6-26 become 1. Meanwhile, as signal $\overline{T}$ an signal An are 0 and signal $\overline{A}$n is 1, the 1 level output signal of NAND circuit 6-25 passes through the transfer gates 6-23 and 6-31 in that state and is applied to the inverter 6-28, and signal Qo becomes 0 and $\overline{Q}$o signal becomes 1. The output signal 1 of NAND circuit 6-25 passes through transfer gate 6-22 and causes the input of inverter 6-27 to be 1. Another input of NAND circuit 6-25 becomes 0. Even in the reset pulse returns from 0 to 1 after than, signal Qo will remain 0 and signal $\overline{Q}$o will remain 1. On the other hand, N channel FET 6-30 is kept in the state of nonconductivity because its gate is receiving a 1 signal by means of signal Qo, and P channel FET 6-29 is in the state of conductivity as its gate is receiving a 0 signal $\overline{T}$.

Upon opening of memory switch S1, standard pulses are applied as inputs to the reversible counting circuit 6, which in turn counts the standard pulses received. Assuming that the output signal Qn of the counting circuit Fn at its last stage changes from 0 to 1 and that $\overline{Q}$n changes from 1 to 0, signals An and $\overline{A}$n become 1 and 0 respectively and are applied as inputs to respective transfer gates 6-21, 6-22, 6-23 and 6-24, by means of which transfer gates 6-21 and 6-24 become conductive and transfer gates 6-22 and 6-23 become non-conductive. The signal Qo being 0 then passes through transfer gate 6-21 and causes the input end of inverter 6-27 to be 0, and consequently, the output end of NAND circuit 6-25 becomes 0. However, signal Qn and signal $\overline{Q}$n are still 0 and 1 signals. Counting by the reversible counting circuit 6 proceeds and the output signal Qn of the last stage counting circuit Fn is supposed to invert from 1 to 0 and signal $\overline{Q}$n to invert from 0 to 1 again. Signals An and $\overline{A}$n are also to change to 0, 1 respectively, thereby permitting transfer gates 6-21 and 6-24 to be nonconductive and 6-22 and 6-23 to be conductive. Accordingly, the output signal 0 of NAND circuit 6-25 then passes through transfer gates 6-23 and 6-31 and is applied to inverter 6-28, thus allowing signal Qo to be 1 and also causing the output signal $\overline{Q}$o of NAND circuit 6-26 to be inverted to 0. By signal Qo becoming 1, N channel FET 6-30 is also brought to the state of conductivity for the first time and the signal $\overline{Q}$o being 0 is applied through N channel FET 6-30 and P channel FET 6-29 to the input terminal of inverter 6-28, and as a result, the output inverter 6-28 is maintained 1. The signal Qo that has become 1 is applied to the gate of transfer gate 6-31, and since another gate terminal is receiving the 0 signal $\overline{T}$, transfer gate 6-31 then becomes nonconductive. For this reason, even if signals An and $\overline{A}$n are applied as inputs, the output signal from NAND circuit 6-25 is not applied as input to inverter 6-28 and therefore signals Qo and $\overline{Q}$o remains 1 and 0. If signal $\overline{T}$ is inverted from 0 to 1 after completion of counting by the reversible counting circuit 6, P channel FET 6-29 becomes nonconductive, the signal passing from the output of NAND circuit 6-26 to the input end of inverter 6-28 is interrupted, and transfer gate 6-31 becomes conductive and works as a binary counting circuit as is known well.

The number of pulses capable of being memorized in the counting circuit by addition to the counting circuit of the circuit Fo provided with holding functions is $2^n$ thru $2^{n+1}$. For example, assume 8 seconds is the maximum time of exposure determined by the capacity of the counting circuit 6. A time of exposure from eight seconds thru 16 seconds can accurately be reproduced for the brightness of a subject that will require between 8 and 16 seconds for the time of exposure, only if the counting Fo provided with holding functions is added to the counting circuit 6.

For the brightness of a subject such that the required time of exosure is in excess of 16 seconds, however, the time of 8 seconds to 16 seconds can be obtained for the time of exposure.

Figure 7:
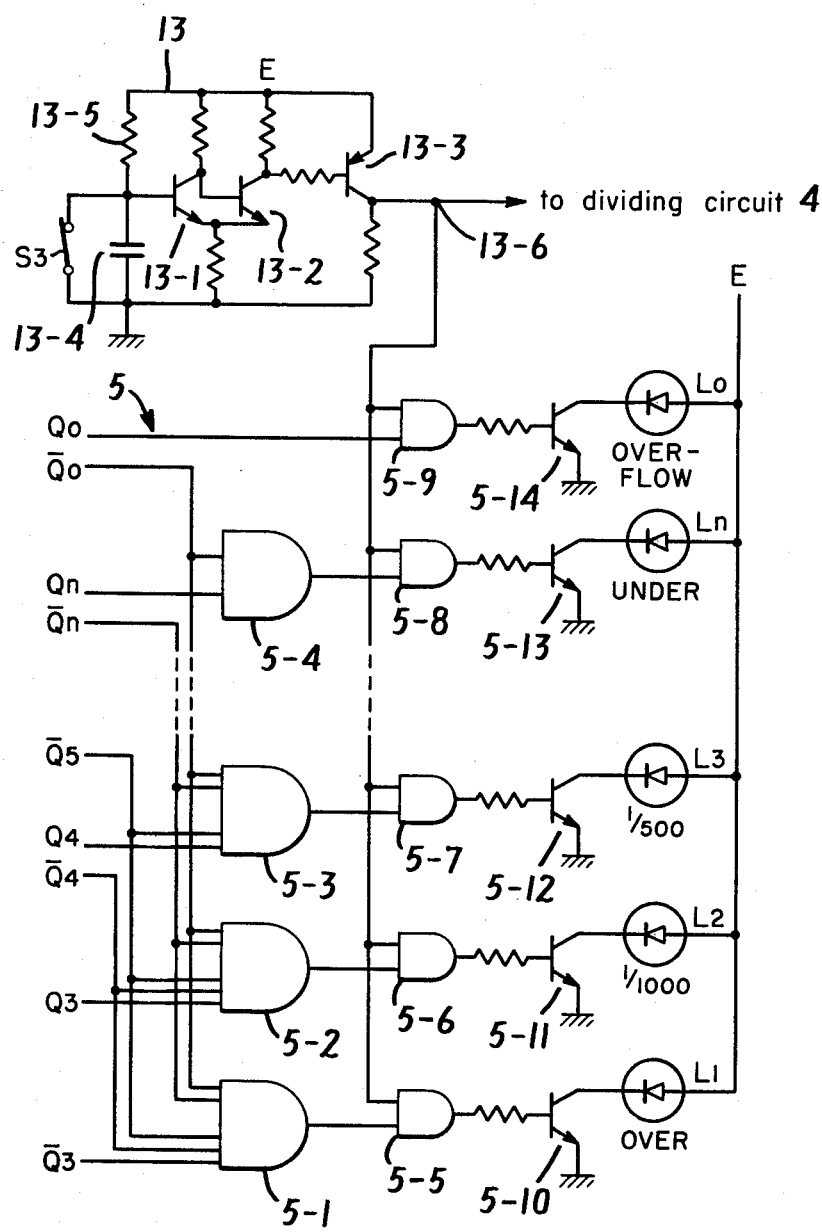
FIG. 7 is a schematic diagram of the delay circuit and display circuit shown in FIG. 1.

FIG. 7 is an embodiment of the display circuit 5 and delay circuit 13 shown in FIG. 1 and FIG. 2. The display circuit 5 receives at the input terminals of AND circuits 5-1, 5-2, 5-3, 5-4 the output signals Q3, $\overline{Q3}$, Q4, $\overline{Q4}$, Q5, $\overline{Q5}$, Qn, $\overline{Qn}$, $\overline{Qo}$, and the outputs of respective AND circuits 5-1, 5-2, 5-3 and 5-4 are applied to the AND circuits 5-5, 5-6, 5-7 and 5-8. The input of AND circuit 5-9 is connected to the output signal Qo of the modified flip-flop circuit Fo provided with holding functions.

The outputs of the AND circuits 5-5, 5-6, 5-7, 5-8 and 5-9 are connected to the respective bases of transistors 5-10, 5-11, 5-12, 5-13 and 5-14 through resistors, and the collectors of the transistors are connected to the display elements L1, L2, L3 - - - Ln, Lo consisting of light emitting diodes. The "OVER" display to show overexposure is achieved when L1 is lighted, "1/1000 S" display when L2 is lighted, "1/500 S" display when L3 is lighted, "UNDER" display to show hand vibration when Ln is lighted, and "OVERFLOW" display to indicate that the display exposure is exceeded when Lo is lighted. Other input terminals of AND circuits 5-5, 5-6, 5-7, 5-8 and 5-9 are connected to the collector of output transistor 13-3 of delay circuit 13. The delay circuit 13 is a Schmidt circuit consisting of transistors 13-1 and 13-2, and output transistor 13-3 connected to the collector of the transistor 13-2. The base of transistor 13-1 is connected as shown to the series circuit composed of resistor 13-5 and condenser 13-4, and timing switch S3 as set forth in FIG. 1 is connected in parallel with condenser 13-4.

By depressing the release button, the reversible counting circuit 6 is reset as described in conjunction with FIG. 2 and then all signals $\overline{Q3}, \overline{Q4}, \overline{Q5}, - - - \overline{Qn}, \overline{Qo}$ become 1 and all signals Q3, Q4, - - - Qn, Qo become 0, and therefore the output of AND circuit 5-1 becomes 1, while the outputs of AND circuits 5-2, 5-3 and 5-4 become 0.

Since timing switch S3 is still being closed, on the other hand, transistors 13-2 and 13-3 are in the state of conductivity and the collector signal level 13-6 of transistor 13-3 becomes 1. Because this 1 signal is applied to the AND circuits 5-5, 5-6, 5-7, 5-8 and 5-9, only the output of AND circuit 5-5 becomes 1 thus causing transistor 5-10 to be rendered conductive, and then L1 is lighted displaying OVER. Meanwhile, other display elements L2, L3 - - - Ln, Lo will not be lighted. Now, suppose four pulses are applied to the reversible counting circuit 6 so that 1/1000 second exposure time is obtained. Then, the Q3 level becomes 1 and $\overline{Q3}$ becomes 0. Accordingly, the output of AND circuit 5-2 becomes 1 and the output of AND circuit 5-6 becomes 1 as well, whereby transistor 5-11 is rendered conductive and L2 is lighted displaying 1/1000 S. Since the input terminal $\overline{Q3}$ of AND circuit 5-1 receives a 0 signal in this case, L1 goes off. If eight pulses are applied as inputs to the reversible counting circuit 6, Q4 level becomes 1 and $\overline{Q4}$ becomes 0, and hence, only the outputs of AND circuit 5-3 and 5-7 become 1, thereby rendering transistor 5-12 conductive, lighting L3 and displaying 1/500 S.

If $2^{n+1}$ pulses are applied to the reversible counting circuit 6, Ln is lighted indicating UNDER for a hand vibration warning and to warn that the exposure time will be long. Moreover, if $2^n$ pulses are applied as an input, the output signal Qo of the counting circuit Fo with holding functions becomes 1 and $\overline{Qo}$ becomes 0 and Lo is then lighted displaying "OVERFLOW" to indicate that the exposure limit has been exceeded, and that after signals Qo and $\overline{Qo}$ will simultaneously remain 1 and 0 even if pulses are delivered as inputs to the reversible counting circuit 6 as explained in conjunction with FIG. 6, and therefore, Lo remains lighted. By lighting one of the display elements L1, L2, L3 - - - Ln, Lo corresponding with the memory values memorized in the reversible counting circuit 6, the photographer may have indicated to him in digital mode the displays of shutter speeds or various warnings.

After the number of pulses corresponding to the brightness of a subject is counted in the reversible counting circuit 6, the shutter opening operation starts, and the timing switch S3 is opened by the shutter blade opening member. Upon opening of the timing switch S3, charging current flows through resistor 13-5 into condenser 13-4, and when the charging voltage of condenser 13-4 reaches the required level transistors 13-1 is rendered conductive, and accordingly, transistors 13-2 and 13-3 are brought to the state of nonconductivity. For this reason the level of collector 13-6 of transistor 13-3 becomes 0. Because the trigger pulses to be inverted from 1 to 0 that have been generated in the collector 13-6 are applied to the AND circuits 5-5, 5-6, 5-7, 5-8 and 5-9, all the levels of AND circuits 5-5, 5-6, 5-7, 5-8 and 5-9 become 0, and consequently all display elements L1, L2, L3 - - - Ln, Lo go off. Meanwhile, the trigger pulses generated in the collector 13-6 of transistor 13-3 are then applied to frequency dividing circuit 4, as set forth in conjunction with FIG. 1, where they start the frequency dividing circuit 4, and thus the subtraction from the memory value which has so far been memorized in the reversible counting circuit 6 begins.

Although the reversible counting circuit 6 is employed as a counting circuit in the embodiments for the present invention, it goes without saying that the present invention is also applicable to the digital memory reproducing system electric shutter circuit of the type in which the number of pulses to change in response to the brightness of a subject is counted in a first counting circuit and pulses from the pulse generator are counted in a second counting circuit in synchronism with the start of the shutter opening and that when the counted values by the first and the second counting circuits become equal, a closing signal for the shutter is generated.

As to what has been mentioned above, according to the present invention, the display of photographic limits is effected by connecting the circuit with holding functions to the last stage of the counting circuit and inverting the output of the circuit with holding functions using pulses from the last stage, after which the circuit having such a holding function holds the state of inversion even if pulses from the last stage are applied as inputs. This minimizes the counting stage of the counting circuit and also it is possible to obtain the time of exposure more than a given time determined by the memory capacity of the counting circuit.

We claim:

1. In a camera shutter control circuit of the type including a pulse generator for developing standard pulses at a given rate; a brightness-time conversion circuit for developing a single pulse inversely proportional to the brightness of a subject to be photographed; a gate circuit receptive of the standard pulses and the single pulse for passing the standard pulses only for the duration of the single pulse; a reversible counting circuit for counting the standard pulses passed by the gate circuit; means for reading out the number of pulses counted by the counting circuit at a lower rate than they were counted and after the camera shutter is open; and means for closing the camera shutter after the content of the counting circuit is zero; the improvement which comprises: said counting circuit comprising a plurality of counting stages including a final stage in cascade and each having outputs representative of the states of the counting stages, the counting stages changing state as the standard pulses are counted; and wherein the final stage of said counting circuit comprises means for rendering the final stage non-responsive to a preceding counting stage after the final counting stage changes state, whereby the content of the counting circuit will remain non-zero if the number of the standard pulses applied thereto exceeds the capacity of the counting circuit and the means for reading out the number of pulses will initiate read out to permit exposure times greater than that determined by the capacity of the counting circuit.

2. In a camera shutter control circuit according to claim 1, further comprising a visual display cooperative with the final counting stage for indicating that the final counting stage has changed state and that the number of standard pulses applied to the counting circuit exceeds the capacity thereof.

3. In a camera shutter control circuit according to claim 1, wherein said final counting stage comprises: a first inverter (6-27) and a first NAND gate (6-25) in cascade, a second inverter (6-28) and a second NAND gate (6-26) in cascade; a pair of transfer gates (6-23, 6-31) in series and connected between the output of said first NAND gate and the input of said second inverter; a third transfer gate (6-21) connected between the input of said first inverter and the output of said second inverter; a fourth transfer gate (6-22) connected between the input of said first inverter and the output of said first NAND gate; a fifth transfer gate (6-24) connected between the input of said second inverter and the output of said second NAND gate; a pair of transistors (6-29, 6-30) connected together in series and in parallel with said fifth transfer gate; means electrically connecting the input of said third transfer gate, a gate electrode of one of said pair of transfer gates, the output of said second inverter, and the gate electrode of one of said transistors; and means electrically connecting the gate electrode of the other of said transistors and a second gate electrode of said one of said pair of transfer gates.

* * * * *